Patented Sept. 26, 1950

2,523,625

UNITED STATES PATENT OFFICE 2,523,625

BODY SOLDER

Donald Lee Jones, Walter Manfred Stark, and Harold B. Underwood, Detroit, Mich., assignors to Ford Motor Company, Dearborn, Mich., a corporation of Delaware No Drawing. Application July 30, 1948, Serial No. 41,714

7 Claims. (Cl. 260—40)

This invention is concerned with the art of metal finishing broadly, and more particularly with a filler or "body solder" employed to fill and conceal joints and depressions in sheet metal objects.

This type of filler or "body solder" finds wide use in the motor vehicle industry where design and manufacturing considerations dictate that two sheet metal parts be joined, and where the joint is so located that it would normally be visible in the finished product. The presence of such a visible joint is esthetically objectionable and has been avoided in the past by the use of such body solders. After such a joint has been made usually by spot welding, the joint has been filled flush with the adjacent surfaces by applying a substantial quantity of a lead tin solder. Such a solder filling makes it possible to paint over the joint and to otherwise finish it in the same manner as the remainder of the body surface.

The use of these lead tin base body solders presents several inherent disadvantages. One of the prime disadvantages is the fact that substantial quantities of tin must be employed if satisfactory adhesion to the steel base is to be obtained. A further disadvantage is the fact that the personnel are required to handle large quantities of lead with the attendant hazards of plumbism. A flux must be employed to insure adequate adhesion between the solder and the base metal and such has given difficulties by becoming entrapped in the surface layers of the solder. Such entrapped flux partially volatilizes during the paint-baking procedure with the concomitant production of bubbles and blisters. Blisters may also be caused by the entrapment of air between successively applied layers of the lead tin solder. This air expands and escapes during the baking operation. In an attempt to circumvent these difficulties and to produce a more economical body-filling material, the present invention was perfected.

Accordingly it is an object of this invention to produce a body-filling material which is free of lead and tin.

It is a further object of this invention to provide a body-filling material which can be applied without the use of a flux.

It is a further object of this invention to provide a body-filling material which will result in a saving in the weight and cost of each vehicle.

A body-filling material which has been found to fulfill all the requirements necessary for successful application to motor vehicle bodies is composed roughly of equal parts of organic material and metallic aluminum. The preferred composition of such a body-filler follows:

100 parts diethylene glycol maleic anhydride resin
44.5 parts styrene monomer
39.8 parts aluminum flake
84.3 parts granular aluminum
0.8 part benzoyl peroxide
0.8 part tri-cresyl phosphate The diethylene glycol maleic acid resin is prepared by heating together 100 parts of maleic anhydride and 120.1 parts of diethylene glycol. This heating is continued until the batch has attained a temperature of about 410° Fahrenheit. This temperature is reached in about two and one-half hours and maintained at that point until the desired degree of polymerization and reaction has taken place. The complete time of this entire heating step is usually about three and one-half hours. During this processing an inert gas cover should be maintained and a rapid blowoff started when the temperature has reached approximately 350° Fahrenheit. This blowoff rids the system of water vapor and other volatile reaction products, and speeds the polymerization reaction. Under these conditions a product should be obtained having an acid number of about 42 and a viscosity of J–K on the Gardner Holt viscosity scale. The resin so prepared is mixed with the styrene monomer, aluminum flake, granular aluminum, benzoyl peroxide and tri-cresyl phosphate to form a paste. Attention is particularly invited to the fact that this body filler, so prepared, contains no solvent which would give trouble during a paint-baking step.

The metal surfaces to which it is desired to apply this body filler should be perfectly clean and slightly roughened, as by sandblasting. The body filler is applied in the form of a paste and smoothed to approximately the desired contour. The material is then cured in place by the application of heat. It is preferred to apply this heat by impinging radiant heat upon the surface of the joint remote from the body filler, although this is not essential and other forms of heat can be used. This material has a relatively high heat conductivity by virtue of the high aluminum content. A temperature of between 180° F.–220° F. at the filler-metal contacting line will initiate "cure." This curing is in reality a polymerization reaction and forms the final resin in situ.

When the curing is complete, the filled joint can be handled in all respects in the same manner as a joint that has been filled with the previously employed lead tin solders. It can be ground or polished to shape, and then painted and baked to give a joint that is very difficult to detect and which will be as durable as the vehicular body to which it is applied. Repairs can be made by curing a patch on fault area, if necessary.

The preferred catalysts in this process have been given as benzoyl peroxide and tri-cresyl phosphate. However, it is to be understood that other known polymerization catalysts can be substituted for the preferred materials if found necessary or desirable. Similarly, while an exact formulation has been given, it is to be understood that the precise quantities given can be varied to suit individual requirements without departing from the spirit of the invention.

We claim as our invention:

1. A composition of matter comprising approximately equal parts by weight of organic and inorganic material, the organic material comprising substantially unpolymerized styrene and a partially polymerized mixture of maleic anhydride and a polyhydric alcohol, and the inorganic material comprising a mixture of flake and granular aluminum.

2. A composition of matter comprising approximately equal parts by weight of organic and inorganic material, the organic material comprising a polymerization catalyst, substantially unpolymerized styrene and a partially polymerized mixture of maleic anhydride and a polyhydric alcohol, and the inorganic material comprising a mixture of flake and granular aluminum.

3. A solvent-free thermo-setting body solder comprising approximately equal parts by weight of an organic and an inorganic material, the organic material comprising substantially unpolymerized styrene and a partially polymerized mixture of maleic anhydride and a polyhydric alcohol, and the inorganic material comprising a mixture of flake and granular aluminum.

4. A solvent-free thermo-setting body solder comprising approximately equal parts by weight of an organic and inorganic material, the organic material comprising substantially unpolymerized styrene and a partially polymerized mixture of maleic anhydride and diethylene glycol, and the inorganic material comprising a mixture of flake and granular aluminum, said body solder being catalyzed by the presence of a small quantity of benzoyl peroxide and tri-cresyl phosphate.

5. A composition of matter comprising approximately equal parts by weight of organic and inorganic material, the organic material comprising substantially unpolymerized styrene and a partially polymerized mixture of maleic anhydride and diethylene glycol having an acid number of about 42 and a viscosity of about J–K on the Gardner Holt viscosity scale, and the inorganic material comprising a mixture of flake and granular aluminum.

6. A solvent-free composition of matter comprising by weight 100 parts of a diethylene glycol maleic anhydride resin, 44.5 parts of styrene monomer, 39.8 parts of aluminum flake, 84.3 parts of granular aluminum, 0.8 part of benzoyl peroxide and 0.8 part of tri-cresyl phosphate, said resin being incompletely polymerized.

7. The method of filling concave imperfections in sheet metal structures comprising filling such imperfections with a solvent-free composition of matter comprising by weight 100 parts of a diethylene glycol maleic anhydride resin, 44.5 parts of styrene monomer, 39.8 parts of aluminum flake, 84.3 parts of granular aluminum, 0.8 part of benzoyl peroxide, and 0.8 part of tri-cresyl phosphate, and curing this composition of matter by the application of heat to the side of the sheet metal remote from the composition of matter.

DONALD LEE JONES.
WALTER MANFRED STARK.
HAROLD B. UNDERWOOD.

REFERENCES CITED

The following references are of record in the file of this patent:

UNITED STATES PATENTS

| Number | Name | Date |
| --- | --- | --- |
| 2,366,850 | Gardner | Jan. 9, 1945 |
| 2,406,227 | King | Aug. 20, 1946 |